Dec. 22, 1964    F. J. MARGIDA    3,162,017
DISPLACEMENT TYPE BRAKE SAFETY VALVE
Filed Dec. 26, 1962    2 Sheets-Sheet 1
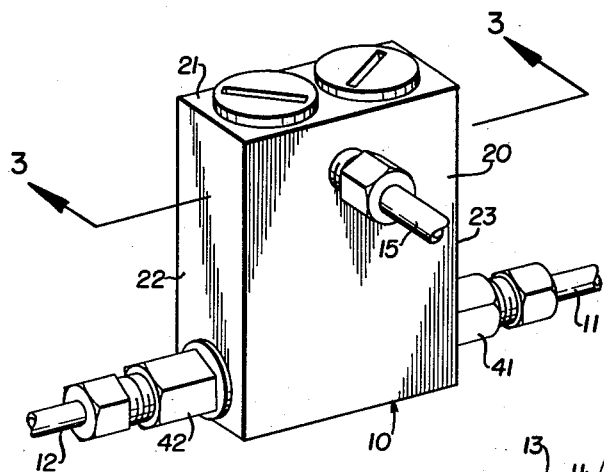
FIG.1
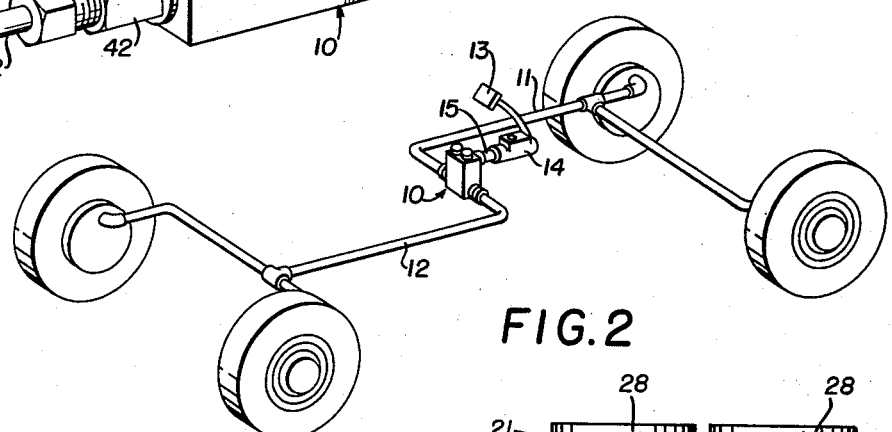
FIG.2
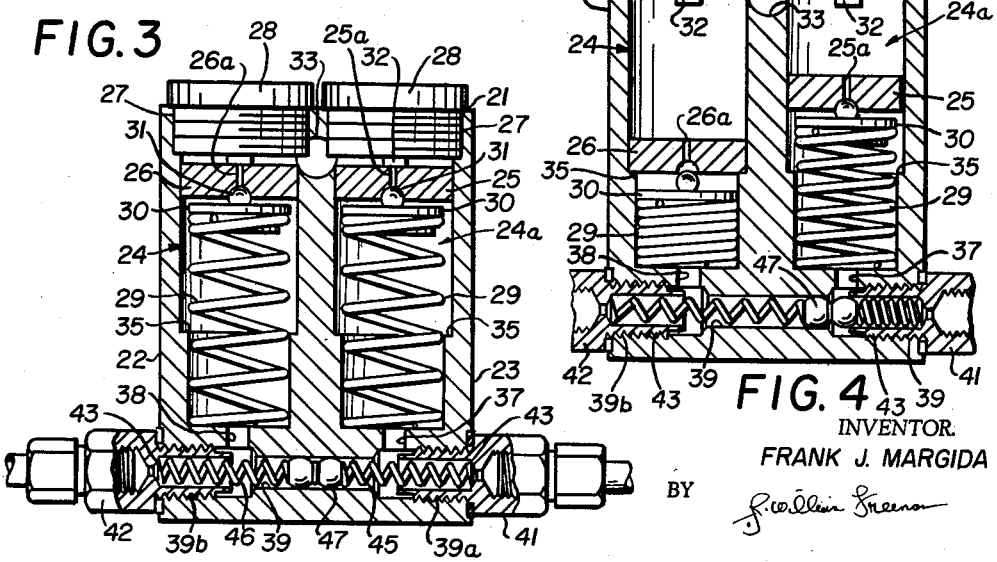
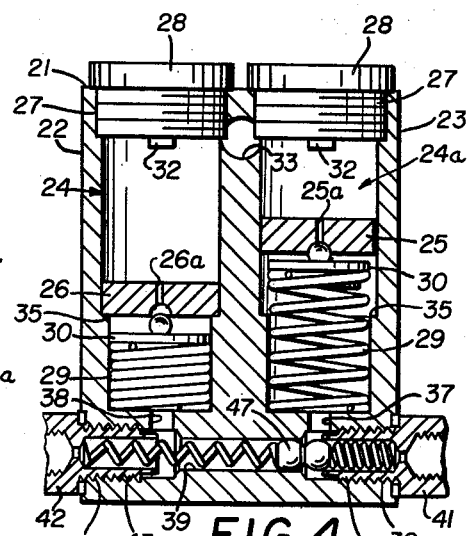
INVENTOR.
FRANK J. MARGIDA
BY
ATTORNEY Dec. 22, 1964   F. J. MARGIDA   3,162,017
DISPLACEMENT TYPE BRAKE SAFETY VALVE
Filed Dec. 26, 1962   2 Sheets-Sheet 2

INVENTOR.
FRANK J. MARGIDA
BY
ATTORNEY

United States Patent Office 3,162,017
Patented Dec. 22, 1964

3,162,017
DISPLACEMENT TYPE BRAKE SAFETY VALVE
Frank J. Margida, Cuyahoga Falls, Ohio, assignor to Saf-T-Brake Valve Co., Inc., Cuyahoga Falls, Ohio, a corporation of Ohio
Filed Dec. 26, 1962, Ser. No. 246,926
8 Claims. (Cl. 60—54.5)

This invention relates to the art of hydraulic brake control systems and in particular has reference to an improved type of safety mechanism for use with hydraulic brake systems of automobiles.

In applicant's prior U.S. Patent No. 2,996,885 dated August 22, 1961, there was provided a displacement type brake safety valve of the type herein being considered.

In essence, the aforementioned brake safety valve utilized a pair of pistons that were reciprocal in appropriate parallel chambers in response to the braking action of the driver with one said piston pressurizing fluid for use in the brake line leading to the front wheel of the car, while the remaining piston actuated the brake fluid to the line leading to the rear brakes of the automobile. In the event of failure of either the front or the rear line, the lack of pressure behind the affected piston caused a locking ball to be drawn into place over the opening leading to the ruptured line with the result that the loss of the entire brake fluid was avoided.

While the safety valve of the aforementioned patent operates satisfactorily in the majority of instances, it has been found that the sensitivity control of the same as well as the safety features thereof can be enhanced by modifying the detail construction of certain of the movable parts that are employed therein.

Specifically, in U.S. Patent No. 2,996,885, the pistons that were reciprocated in the interior chambers were of a sufficient diameter to provide limited clearance between the same and the wall of the chamber within which they reciprocated, with the result that in the event the piston became stuck for any reason, a limited amount of braking fluid would be forced around the edges to permit limited operation of the braking unt. While this provided a form of safety feature, it nonetheless possessed the disadvantage of reducing the sensitivity of the valve.

It has been found that the desired safety features can be provided while still providing a valve that has increased sensitivity over the valve shown and described in U.S. Patent No. 2,996,885.

Specifically, the improved valve contemplates the use of a sealing ledge that will make sealing contact with the underside of the pistons as the same reach their limit of downward movement to thus seal off all further flow around the piston after the same has bottomed on the sealing ledge. While this provides excellent sensitivity with regard to the valve operation, it has been found that the safety features required can be achieved by providing a valve of this improved type with a normally closed relief valve that will operate only after increased pressure is applied to the seated piston.

Thus, the improved piston while functioning as a plain piston in the normal instance, will have the added feature of a pressure relief that will operate upon the existence of increased pressure to always insure that braking fluid is being directed into the operable line that has not been sealed off following failure.

As a still further improvement, it has been found that additional advantage can be achieved by delivering different volumes of braking fluid to the front and rear lines of the hydraulic system so that fluid is received in proportion to the capacity of the wheel cylinders to receive the same.

In applicant's earlier application which has now matured into U.S. Patent No. 2,996,885 as above described, the chambers for the front and rear systems were of identical size and accordingly equal amounts of braking fluid were supplied to the front and rear wheels notwithstanding the fact that the same were oftentimes provided with different size actuating pistons. It has been discovered, however, that by varying the size of either the pistons, the auxiliary chambers, the main chambers or the combination of the above, that a greater amount of braking fluid can be supplied in one line than the other so as to provide the greatest braking pressure where required.

Production of an improved type brake safety valve having the above improvement and advantages accordingly becomes the principal object of this invention, with other objects of the invention thereof becoming more apparent upon a reading of the following brief specification, considered and interpreted in the light of the accompanying drawings.

Of the drawings:

FIGURE 1 is a perspective view of the improved brake safety valve.

FIGURE 2 is a perspective schematic view illustrating the improved brake safety valve positioned on the hydraulic braking system of an automobile.

FIGURE 3 is a vertical section taken on the lines 3—3 of FIGURE 1 and showing the position of the component parts under normal operating conditions.

FIGURE 4 is a view similar to FIGURE 3 but showing one of the pistons in depressed condition with the relief valve thereof being unseated so as to permit fluid passage therethrough.

Figure 5:
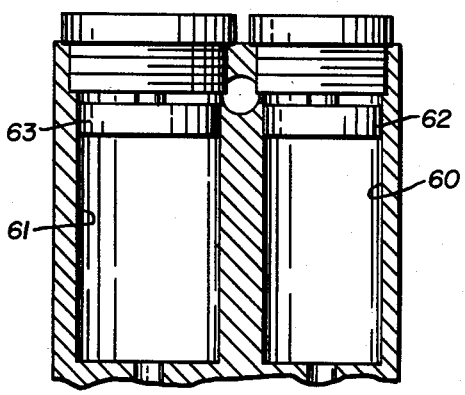
FIGURES 5, 6 and 7 are semi-schematic views similar to FIGURE 4 but showing other modifications wherein the size of the braking chamber is varied.

Referring now to the drawings and in particular to FIGURE 2 thereof, the improved brake safety valve, generally indicated by the numeral 10 is shown positioned in connected relationship with a front brake line 11 and a rear brake line 12 with hydraulic pressure being delivered to the braking mechanisms of the front and rear wheels upon depression of the usual foot pedal 13, with such depression serving to pressurize the braking fluid contained in the master cylinder 14 as is well known in the prior art and with the master cylinder 14 also being connected to the brake safety device 10 through a line 15 as clearly shown in FIGURES 1 and 2 of the drawings.

Turning now to the detailed consrtuction of the brake safety device 10, it will be noted from FIGURE 1, that the same is of rectangular box-like configuration so as to include a front face 20, a top surface 21 and opposed side surfaces 22 and 23. The top face 21 is provided with a pair of displacement chambers that are generally designated by the numerals 24a and 24 with piston 25 reciprocating in chamber 24a while piston 26 similarly reciprocates in chamber 24. The chambers 24a and 24 are preferably identical in the form of the invention shown in FIGURES 1 through 4 of the drawings, and accordingly each includes a threaded opening 27 that opens into the top surface 21 for reception of an appropriately contoured cap 28 that serves to seal off the open end of each chamber as clearly shown in FIGURES 3 and 4 of the drawings. Return springs 29, 29 are positioned between the lower end of each chamber and the underside of the piston received therein, with each return spring 29 preferably having fixed to the upper end thereof a plate 30 to which is integrally secured a closure ball 31. The ball 31 serves as a relief valve and is normally urged into seated relationship with each opening 25a and 26a of the piston members 25 and 26, with such seated condition serving to seal off fluid flow through the bores 25a and 26a of the piston members 25 and 26.

The lower end of each cap member 28 further includes protuberances 32 that engage the upper face of the piston members 25 and 26 so as to maintain the same in spaced relationship with the lower face of the cap member 28 and thus provide for the entry of fluid through bore 33, with such fluid entering bore 33 through the line 15 that connects the master cylinder with the safety device 10.

Additionally, each bore 24 and 24a includes a shoulder 35 against which the pistons 25 and 26 may seat upon completing their full down travel with this condition being shown to exist in the chamber 24 when the same is positioned as shown in FIGURE 4 of the drawings.

The aforementioned displacement chambers 24a and 24 conect at their lower end, through the medium of bores 37 and 38, with a main bore 39 that extends transversely of the unit 10 between the opposed faces 22 and 23 thereof, with this bore being clearly shown in FIGURES 3 and 4 of the drawings.

The opposed ends of the bore 39 are threaded, as at 39a and 39b, to permit reception of threaded fittings 41 and 42, with these fittings each having a seat 43 within which one end of spring members 45 and 46 may be received, with the other end of each such spring bearing against the opposed ends of a ball control member 47 that is substantially equivalent in diameter to the diameter of the bore 39. In this fashion, when the pressure to the right of the ball control 47 is rapidly decreased as in the case of a rupture in line 11, the ball 47 will shift rapidly to the right under the force of the fluid being pressurized beneath downwardly moving piston 26, and will seal off the opening to the front brake line 11 so as to avoid further loss of fluid through the rupture that exists through such line.

With reference to the opening 43 and referring to FIGURES 3 and 4, it will be noted that the same is only slightly undersized with regard to the diameter of the ball members provided in the closure element 47. This permits the ball to be firmly seated almost throughout its circumference within the fitting 43 with this condition being shown in FIGURE 4 and with this arrangement providing an improved metal to metal seal.

In operation of the device shown in FIGURES 1 through 4, the application of braking pressure by the pedal 13 will cause fluid from the master cylinder to be directed into the displacement chambers 24a and 24 through the bore 33, with the fluid that enters exerting a downward pressure on the pistons 25 and 26. Since braking fluid is on both sides of the piston members 25 and 26, this application of downward force will cause the pistons 25 and 26 to be moved downwardly in unison and thus compress the fluid that is trapped beneath the same, thus applying equalized braking pressure to the lines 11 and 12. However, and in the event of a failure such as is shown in FIGURE 4, there will be no pressure to the right hand side of the ball 47 and accordingly the force of the fluid being compressed beneath piston 26 will urge the ball 47 rapidly to the right to seal off the opening of the line 11, with this condition being illustrated in FIGURE 4.

FIGURE 4 also shows the operation of the pressure relief valve arrangement, with the pressure relief valve 31 associated with the piston 26 being shown unseated in FIGURE 4 of the drawings. In this regard, it will be noted that the valve 25 has only been able to move approximately half way down because of the fact that the fluid trapped beneath the same will be unable to escape and will accordingly normally increase in pressure so as to resist further downward movement of the piston 25 beyond the position of FIGURE 4.

However, it will be noted that the piston 26 has moved down due to the increased pressure applied upon the same and that the same has moved down to a position where it has become seated on the shelf or ledge 35. At this point and in the event that no further provision were made, it would be impossible to get any additional fluid into the line 12 to operate the brakes thereof. However, if the braking pressure continues and the pressure builds up, the valve 31 will become unseated by such increased pressure to permit the passage of additional fluid through the opening 26a and ultimately to the line 12 for the purpose of operating the brakes controlled thereby.

Further, in this regard, it is to be noted that in the event that both pistons, during normal operation, should be stuck for some abnormal reason in their down position, there would nonetheless be provided a provision for supplying the braking lines with the requisite amount of fluid to operate the braking cylinders attached to the front and rear wheels so that in all events, complete safety is provided in connection with the improved form of the invention, while the sensitivity is simultaneously enhanced by the seal off provision above described.

Figure 6:
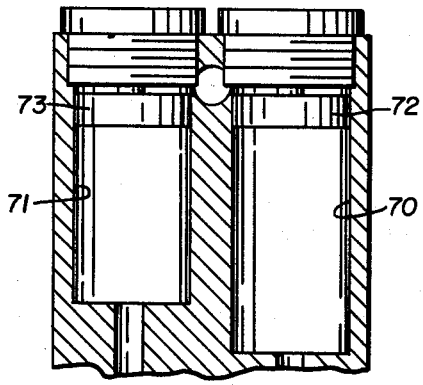
Figure 7:
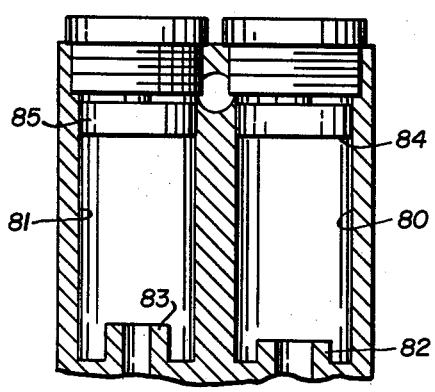

Turning now to the modification of the invention shown in FIGURES 5 through 7 inclusive, it should first be noted that all of the various forms of the invention shown in these figures are directed to the use of unequal size displacement chambers for the purpose of supplying greater amounts of fluid to a selected brake line, with the normal procedure being to provide bigger pistons on the front wheel brakes of a passenger car, while bigger or double pistons are provided on the rear wheels of a commercial truck vehicle in the normal instance.

Accordingly, in FIGURES 5 through 7, redescription of the body or the connector components of the hydraulic brake system will not be described with it being understood that the device in question would be operable appropriately with the hydraulic system in the manner described in detail in connection with FIGURES 1 through 4 of the drawings.

With reference to FIGURE 5, the chamber 60 is of a smaller diameter than the chamber 61 so that the piston 62 will displace a lesser amount of fluid than will be displaced by the piston 63 in the same equivalent downward travel of both piston members.

In FIGURE 6, the chamber 70 is of greater axial length than the chamber 71 although both chambers are of the same diameter and have pistons 72 and 73 that are identical in dimension with the greater volume being displaced by piston 72 because of the fact that the same can travel a greater axial distance and accordingly displace a greater amount of trapped fluid.

Much the same result is obtained in the modification of FIGURE 7 where the chambers 80 and 81 are identical in diameter, with the boss 82 of chamber 80 projecting a lesser amount upward than the boss 83 of the chamber 81. Accordingly, and with the travel of the respective pistons 84 and 85 being limited by engagement with the just described boss members 82 and 83, the piston 84 will displace a greater amount of fluid than will be displaced by piston 85 because of the greater travel permitted the same.

With reference to all of the modifications just described, the piston members employed have now been described in detail and in this regard, it is to be understood that a perfectly plain piston could be used in each instance if desired. It is equally understood, however, that the improved piston of FIGURES 1 through 4 together with the relief valve thereof could be used if desired.

Accordingly, it will be seen from the foregoing, how there has been provided a new and improved type of improved displacement type brake safety device that is characterized by improved sensitivity during operation while yet possessing absolute safety in the event of clogging or sticking due to the existence of abnormal conditions.

While a full and complete description of the invention has been set forth in accordance with the dictates of the patent statutes, it is to be understood that the invention is not intended to be limited to the specific embodiment herein shown. Thus, for example, the various examples of FIGURES 5 through 7 could be incorporated in combination with each other. Also, the flat plate that is attached to the return springs provided in FIGURES 1 through 4 beneath the individual pistons could be loosely attached and could further be loosely attached with respect to the closure ball that seals off the opening in each piston. Additionally, other forms or types of relief valves could be provided in this regard. It is to be noted also in this regard, that in the event that a solid piston were used, in lieu of the pressure relief piston shown in FIGURES 1 through 4, then and in that event, it would be possible to achieve a certain degree of relief by having one or more slots provided and extending radially inwardly from the periphery of the solid piston so that a certain limited degree of fluid could pass around the piston even though the same was in substance sealed off by virtue of the same being seated on the receiving shelf described.

Accordingly, modifications of the invention may be resorted to without departing from the spirit hereof or the scope of the appended claims.

What is claimed is:

1. A safety device for controlling hydraulic flow between the master cylinder and the front and rear brake lines of an automotive vehicle, comprising;
    A. a housing having
        (1) an axial bore therethrough that defines
            a. outlet ports that communicate with said front and rear brake lines;
        (2) first and second elongate fluid reservoirs each having
            a. an axial length;
        (3) connecting passages connecting at one axial end of said reservoirs with said axial bore at axially spaced points therein;
        (4) an inlet port connected to said master cylinder;
        (5) conduit means connecting said inlet port with the remaining axial ends of said reservoirs;
    B. first and second pistons each being
        (1) respectively received in said first and second reservoirs and being
        (2) shiftable axially thereof in response to pressure from said master cylinder;
    C. spring members urging said pistons away from said connecting passages;
    D. a valve element
        (1) balanced medianally of said axial bore and
        (2) being shiftable into seating engagement with either of said outlet ports to terminate flow therethrough upon failure of the brake line associated therewith;
    E. sealing means
        (1) defined by at least one said reservoir and at least one said piston and
        (2) preventing the flow of braking fluid past said piston to and toward said connecting passage after predetermined movement of said pistons toward said connecting passage associated therewith;
    F. and relief means
        (1) permitting flow of additional fluid past at least one said piston during the period said sealing means are operative, with said flow occurring in response to pressure from said master cylinder greater than the pressure normally required to move said pistons.

2. The device of claim 1 further characterized by the fact that said sealing means include
    A. a radial shoulder defined by the walls of said reservoirs with said pistons being respectively seated against said shoulders during movement toward said connecting passage.

3. The device of claim 1 further characterized by the fact that said relief means include
    A. a relief passage interconnecting the opposed faces of at least one said piston;
    B. a closure element normally urged into covering relationship with the end of said relief passage that is disposed closest to said connecting passage associated therewith and urged into uncovering relationship in response to pressure from said master cylinder.

4. The device of claim 3 further characterized by the fact that said closure element is carried by the end of said spring member that engages said piston.

5. A safety device for controlling hydraulic flow between the master cylinder and the front and rear brake lines of an automotive vehicle, comprising;
    A. a housing having
        (1) an axial bore therethrough that defines
            a. outlet ports that communicate with said front and rear brake lines;
        (2) first and second elongate fluid reservoirs each having
            a. an axial equal length;
            b. and having different diameters
        (3) connecting passages connecting at one axial end of said reservoirs with said axial bore at axially spaced points therein;
        (4) an inlet port connected to said master cylinder;
        (5) conduit means connecting said inlet port with the remaining axial ends of said reservoirs;
    B. first and second pistons each being
        (1) respectively received in said first and second reservoirs and being
        (2) shiftable axially thereof in response to pressure from said master cylinder;
        (3) and each said piston having equal axial lengths and unequal diameters
    C. spring members urging said pistons away from said connecting passages;
    D. a valve element
        (1) balanced medianally of said axial bore and
        (2) being shiftable into seating arrangement with either of said outlet ports to terminate flow therethrough upon failure of the brake line associated therewith;
    E. and displacement control means
        (1) defined by said respective reservoirs and the pistons associated therewith, and
        (2) displacing different volumes of braking fluid to said front and rear lines upon movement of said pistons in response to equal pressures.

6. The device of claim 5 further characterized by the fact that said first reservoir and first piston have diameters that are different from the diameters of said second reservoir and said second piston.

7. The device of claim 5 further characterized by the fact that said first and second pistons and reservoirs are of equal diameter while said first reservoir has a greater axial length than said second reservoir.

8. A safety device for controlling hydraulic flow between the master cylinder and the front and rear brake lines of an automotive vehicle, comprising;
    A. a housing having
        (1) an axial bore therethrough that defines
            a. outlet ports that communicate with said front and rear brake lines;
        (2) first and second elongate fluid reservoirs each having
            a. a substantially equal diameter and axial length;
        (3) connecting passages connecting at one axial end of said reservoirs with said axial bore at axially spaced points therein;
        (4) an inlet port connected to said master cylinder;
        (5) conduit means connecting said inlet port with the remaining axial ends of said reservoirs;
    B. first and second pistons of substantially equal dimensions each being (1) respectively received in said first and second reservoirs and being
(2) shiftable axially thereof in response to pressure from said master cylinder;

C. spring members urging said pistons away from said connecting passages;

D. a valve element
(1) balanced medianally of said axial bore and
(2) being shiftable into seating arrangement with either of said outlet ports to terminate flow therethrough upon failure of the brake line associated therewith;

E. and displacement control means
(1) including stop means disposed in said reservoirs and limiting the amount of axial movement of said pistons;

a. whereby different volumes of braking fluid are displaced to said front and rear lines upon movement of said pistons in reponse to equal pressures.

References Cited in the file of this patent
UNITED STATES PATENTS

| | | |
|---|---|---|
| 2,526,721 | Bacca | Oct. 24, 1950 |
| 2,539,970 | Pollard et al. | Jan. 30, 1951 |
| 2,774,958 | Aldasoro | Dec. 18, 1956 |
| 2,996,885 | Margida | Aug. 22, 1961 |